US008588163B2

(12) United States Patent
Lin et al.

(10) Patent No.: US 8,588,163 B2
(45) Date of Patent: Nov. 19, 2013

(54) RANDOM ACCESS METHOD, PARAMETER ASSIGNMENT METHOD, WIRELESS COMMUNICATION DEVICE, AND BASE STATION USING THE SAME

(75) Inventors: Jung-Mao Lin, Taichung (TW); Chie-Ming Chou, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 211 days.

(21) Appl. No.: 13/196,911

(22) Filed: Aug. 3, 2011

(65) Prior Publication Data
US 2012/0082103 A1 Apr. 5, 2012

Related U.S. Application Data (60) Provisional application No. 61/388,898, filed on Oct. 1, 2010.

(51) Int. Cl.
H04W 4/00 (2009.01)
(52) U.S. Cl.
USPC .......................................... 370/329; 370/328
(58) Field of Classification Search
USPC .................. 370/322, 328, 329, 338
See application file for complete search history.

(56) References Cited

U.S. PATENT DOCUMENTS

| | | | |
|---|---|---|---|
| 6,345,294 B1 * | 2/2002 | O'Toole et al. | 709/222 |
| 2008/0273482 A1 * | 11/2008 | Lee et al. | 370/312 |
| 2008/0310378 A1 * | 12/2008 | Kitazoe et al. | 370/338 |
| 2009/0129330 A1 * | 5/2009 | Kim et al. | 370/329 |
| 2009/0175253 A1 * | 7/2009 | Wu et al. | 370/338 |
| 2010/0057485 A1 | 3/2010 | Luft | |
| 2010/0111067 A1 * | 5/2010 | Wu | 370/345 |
| 2010/0146117 A1 | 6/2010 | Hoeksel | |
| 2010/0157796 A1 | 6/2010 | Chin et al. | |
| 2010/0309877 A1 * | 12/2010 | Damnjanovic et al. | 370/331 |

* cited by examiner

Primary Examiner — Hassan Phillips
Assistant Examiner — Siren Wei
(74) Attorney, Agent, or Firm — Jianq Chyun IP Office (57) ABSTRACT

A random access method, a parameter assignment method, a wireless communication device, and a base station using the same are provided. The random access method is adapted for the wireless communication device to perform a random access process with the base station, and includes following steps. The wireless communication device transmits a preamble code to the base station, obtains an indicator in a packet transmitted from the base station, and determines whether to obtain a first random access response and a second random access response according to the indicator. When the transmission of the preamble code by the wireless communication device encounters a collision and the indicator is set the wireless communication device performs a random access process by using the command in the first random access response. Otherwise, the wireless communication device performs the conventional process.

18 Claims, 9 Drawing Sheets

RANDOM ACCESS METHOD, PARAMETER ASSIGNMENT METHOD, WIRELESS COMMUNICATION DEVICE, AND BASE STATION USING THE SAME

CROSS-REFERENCE TO RELATED APPLICATION

This application claims the priority benefits of U.S. provisional application Ser. No. 61/388,898, filed on Oct. 1, 2010. The entirety of the above-mentioned patent application is hereby incorporated by reference herein and made a part of this specification.

TECHNICAL FIELD

The disclosure relates to a random access method adapted for wireless communication devices of different priority classes to access wireless network, a parameter assignment method, and a base station and a wireless communication device using the same.

BACKGROUND

Presently, the machine type communication (MTC) technology is gradually developed. It can be expected that in the near future, the number of MTC devices will be continuously increased and will eventually exceed the number of human-to-human communication (H2H) devices. In an existing wireless communication system, H2H devices and MTC devices are allowed to access the same random access resources. If there are a large number of MTC devices, the random access channels (RACH) may be overloaded, and accordingly the H2H devices cannot carry out communication procedures properly. In order to avoid such situation, the base station may configure large amount of RACHs for MTC devices and H2H devices performing random access procedure. As a result, the increasing RACH resource will reduce the available wireless communication resources to other wireless communication functions.

To prevent affecting the normal wireless communication functions, two conventional resolution approaches have been proposed, and it avoids RACH overload when a large number of MTC devices carrying out wireless communication procedures. The first resolution approach is MTC devices oriented (which may be referred to as a push based technique). The first resolution approach can be further categorized into: (a) application level time separation, where MTC devices in different groups are arranged to access wireless network at different times; (b) specific back-off (BO) scheme, where when a collision is encountered, MTC devices adopt different BO times to reduce the possibility of another collision; (c) specific access class barring scheme (or specific ACB scheme), where MTC devices are grouped in advance to use different ACB factors, and MTC devices corresponding to different ACB factors use different ACB timers, so as to control the admission of random access to reduce the collision possibility; (d) separate RACH resource, wherein MTC devices and H2H devices use different RACHs for their random access process.

The second solution approach is a pull based technique, where the MTC devices passively receive RA time points appointed by a network.

Although the push based resolution approach is proposed, the existing parameter assignment methods of wireless communication systems are not able to support the approach for MTC devices. For example, the BO parameter assignment method in an existing wireless communication system cannot accomplish the specific BO schemes mentioned above. It is because that when different wireless communication devices attempt to transmit preamble codes to a base station at the same time, the base station cannot distinguish H2H devices and MTC devices and still assign the same BO parameter to these communication devices. For example, in an existing wireless communication system, both ACB parameters and RACH parameters are delivered by the base station (for example, an eNB broadcasts these two types of parameters in its system information blocks (SIB)). These parameters are broadcasted and have periodic appearance periods, and accordingly, a longer modification period has to be specified to prohibit making the adjustments of these ACB parameters and RACH parameters during the period. For example, an ACB parameter or a RACH parameter can only be modified once at the modification period boundary (MPB) of SIB2, which cannot immediately change system information based on the loading of RACH. Thus, an existing wireless communication system cannot effectively respond to the loading of a RACH, and H2H devices which do not need aforementioned parameters still have to receive such system messages.

Thereby, it is a major concern in the industry to prevent MTC devices from affecting H2H devices when the MTC devices perform random access procedures and effectively reflect the utilization state (network loading state) of a RACH, so as to adjust the RA behaviors of the MTC devices in real time.

SUMMARY

A random access method, a parameter assignment method, a wireless communication device, and a base station using the same methods are introduced herein.

According to an exemplary embodiment of the disclosure, a random access method is provided. The random access method is adapted for a wireless communication device to perform a random access process with a base station, and includes following steps: transmitting, at the wireless communication device, a preamble code to the base station; obtaining, at the wireless communication device, an indicator in a packet transmitted by the base station; determining, at the wireless communication device, whether to obtain a first random access response in the packet according to the indicator; and searching, at the wireless communication device, for a second random access response in the packet according to the preamble code.

According to an exemplary embodiment of the disclosure, a parameter assignment method is provided. The parameter assignment method is adapted to a base station, and includes following steps: receiving, at the base station, at least one preamble code in a random access resource; determining, at the base station, an indicator in a packet, where when the indicator is set up, at least a first random access response and at least a second random access response are appended in the packet, and when the indicator is not set up, just at least a second random access response are appended in the packet; and transmitting, at the base station, the packet.

According to an exemplary embodiment of the disclosure, a wireless communication device is provided. The wireless communication device is adapted to perform a random access process with a base station, and includes a communication protocol module, a search unit, and a determination unit. The communication protocol module is configured for transmitting a preamble code to the base station. The search unit is connected to the communication protocol module, and configured for obtaining an indicator in a packet transmitted from the base station. The determination unit is connected to the communication protocol module and the search unit is configured for determining whether to obtain a first random access response in the packet according to the indicator In addition, the search unit is also configured for searching for a second random access response in the packet according to the preamble code.

According to an exemplary embodiment of the disclosure, a base station is provided, and the base station includes a communication protocol module and a determination unit. The communication protocol module is configured for receiving at least one preamble code in a random access resource. The determination unit is connected to the communication protocol module, and configured for determining an indicator in a packet, where when the indicator is set up, the determination unit appends at least a first random access response and at least a second random access response in the packet, and when the indicator is not set up, the determination unit appends just at least a second random access response in the packet. In addition, the communication protocol module transmits the packet.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

In the present disclosure, exemplary embodiments provide a random access method, a parameter assignment method, a wireless communication device, and a base station using the same methods.

In the present disclosure, the term "user equipment (UE)" can be referred to as "mobile station (MS)", "advanced mobile station (AMS)", or machine type communication (MTC) device, and a MTC device may refer to an in-car communication device, a sensor, a water meter, a gas meter, an electricity meter, a sensing device, a digital camera, a mobile phone, a smart phone, a personal computer (PC), a notebook PC, an Internet PC, a digital TV, or a tablet PC. In addition, in the disclosure, the term "base station" can be referred to as "advanced base station (ABS)", "node B", or "eNode B".

In the present disclosure, the term "downlink" refers to the RF signal transmission from a base station to a wireless communication device within the radio coverage of the base station; the term "uplink" refers to the RF signal transmission from a wireless communication device to its access base station.

Exemplary embodiments of the disclosure provide a random access method adapted for wireless communication devices having different predetermined priorities (priority classes) to access a wireless channel and a base station and a communication device using the same methods. A method of assigning back-off (BO) parameters in an existing wireless communication system will be roughly explained before describing the random access method.

In the first step of an existing BO parameter assignment method, when a wireless communication device transmits a random preamble code in a specific wireless resource, for example, a random access channel (RACH) (RACH is used to represent this specific wireless resource hereinafter) to a base station, the wireless communication device calculates a specific identifier like random access-radio network temporary identifier (RA-RNTI) according to information related to the specific wireless resource at the same time.

Figure 1:
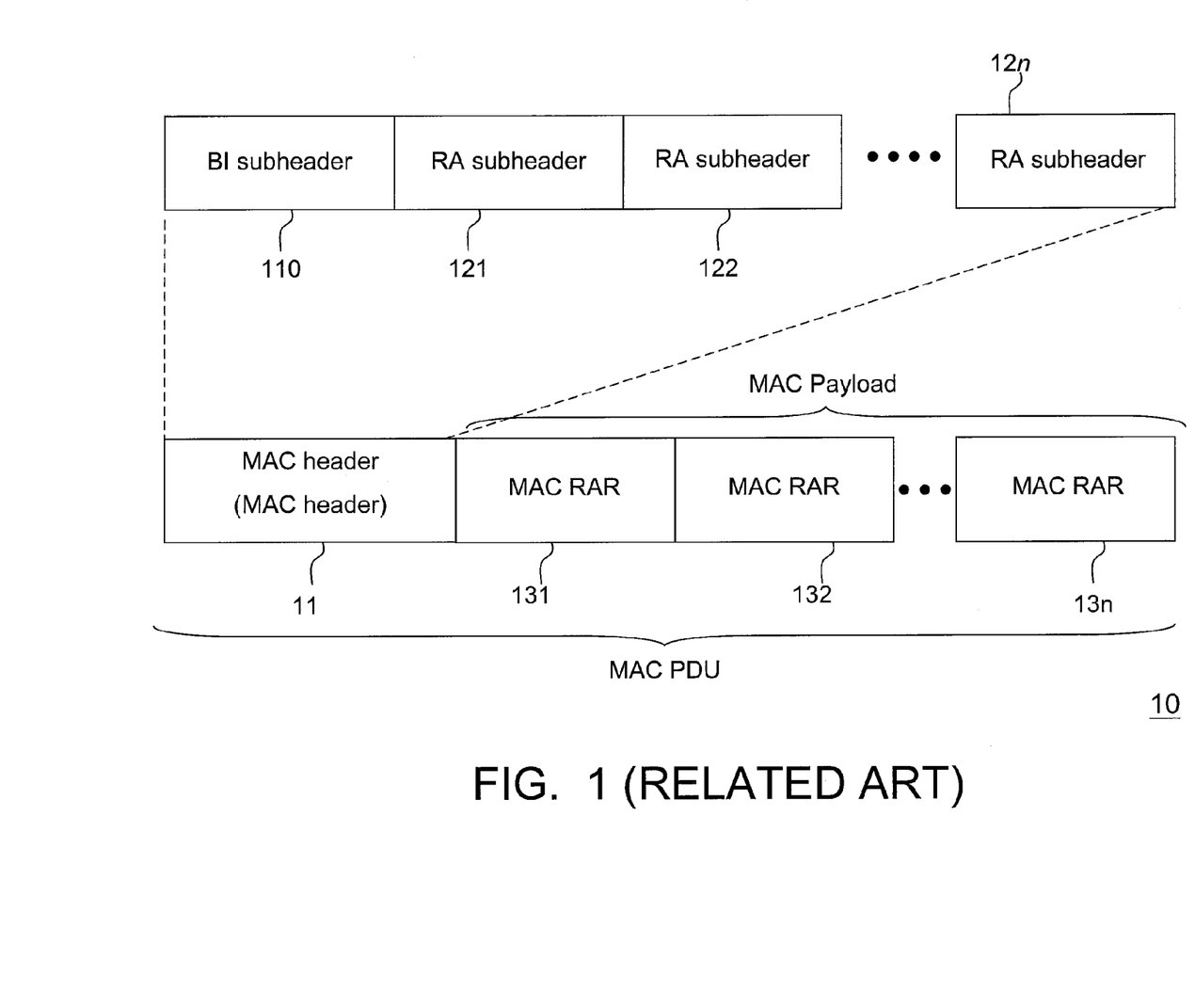
FIG. 1 is a schematic diagram of a MAC PDU.

In the second step of the existing BO parameter assignment method, the wireless communication device tries to receive a MAC PDU whose allocation is indicated by a downlink control channel (for example, a PDCCH) with RA-RNTI. The MAC PDU contains the random access responses regarding with the preamble received by the base station. FIG. 1 is a schematic diagram of a MAC PDU. As shown in FIG. 1, the MAC PDU 10 includes a MAC header 11 and a plurality of MAC RARs 131, 131, ..., and 13n. The MAC RARs 131, 131, ..., and 13n are MAC payloads. The MAC header 11 includes a back-off indicator (BI) subheader 110 and a plurality of RA subheaders 121, 122, ..., and 12n. Different fields in the BI subheader 110 and the RA subheader 121 will be respectively explained with reference to FIG. 2A and FIG. 2B.

Figure 2A:
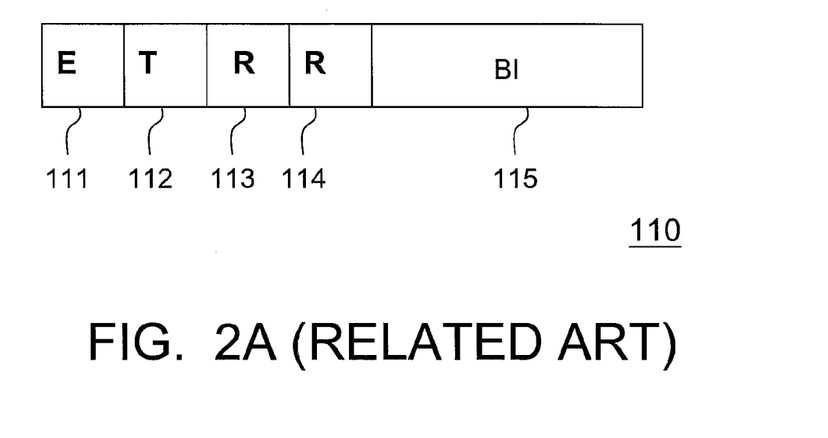
FIG. 2A is a schematic diagram of a back-off indicator (BI) subheader.

FIG. 2A is a schematic diagram of the BI subheader 110. As shown in FIG. 2A, the BI subheader 110 includes an extension field (E) 111, a type field (T) 112, a reserved bit (R) 113, a reserved bit (R) 114, and a BI field 115, where the BI field 115 contains a BI value.

Figure 2B:
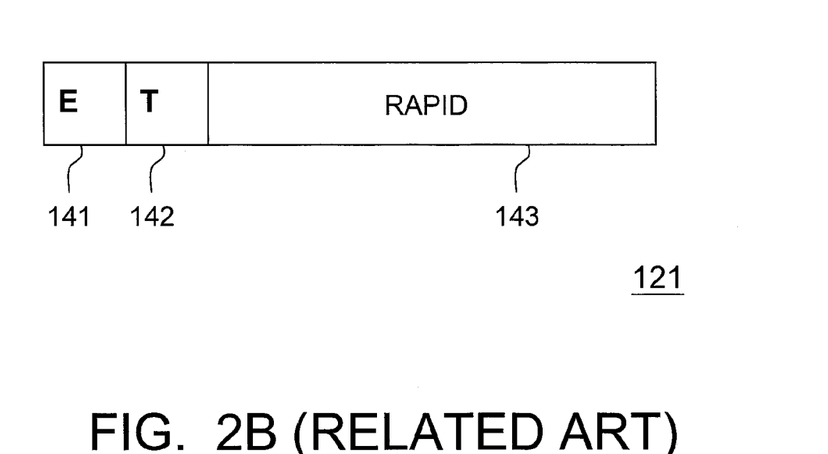
FIG. 2B is a schematic diagram of a random access (RA) subheader.

FIG. 2B is a schematic diagram of the RA subheader 121. As shown in FIG. 2B, the RA subheader 121 includes an extension field (E) 141, a type field (T) 142, and a random access preamble code identifier (RAPID) field 143. The RAPID field 143 shows the random preamble code transmitted by the wireless communication device.

After receiving the MAC PDU, in the third step of the existing BO parameter assignment method, the wireless communication device reads the BI subheader in the MAC PDU. The wireless communication device also checks whether a RA subheader in the MAC PDU with using the RAPID regarding to its transmitted preamble code, and reads the corresponding MAC RAR when the RA subheader existed. For example, when the wireless communication device finds the transmitted random preamble code in the RAPID field 143 of the RA subheader 121, since the RA subheader 121 is the first RA subheader allocated after the BI subheader 110, the corresponding MAC RAR is the first MAC RAR 131 allocated after the MAC header 11. Similarly, when the wireless communication device finds the transmitted random preamble code in the RAPID field of the RA subheader 12n, the corresponding MAC RAR is then the $n^{th}$ MAC RAR after the MAC header 11.

Meanwhile, the wireless communication device further reads a BI value in the BI subheader and then maps to a corresponding BO parameter value (or a BO window value) based on a BO parameter mapping table. The BO parameter mapping table can be the following Table 1. When the wireless communication device can not find its belonged MAC RAR, the wireless communication device will back-off for a period of time where the period is the obtained BO parameter value. Then, the wireless communication device re-transmits a random preamble code to wait for another response. Oppositely, when the wireless communication device can find its belonged MAC RAR, the wireless communication device will perform the following operations without back-off.

TABLE 1

| Indicator | BO Parameter Value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

In order to prevent wireless communication devices of lower priorities (or lower priority classes) from competing with wireless communication devices of higher priorities (or higher priority classes) for wireless resources when the RACH is in a heavily loaded state, in the proposed random access method, the base station can use a specific location (for example, the back-off indicator (BI) subheader to indicate the current loading state of the RACH. For example, the base station can use a reserved bit in the BI subheader as an indicator for indicating the current loading state of the RACH (for example, a heavily loaded state or a lightly loaded state). For another example, the base station uses the reserved bit (R) 113 in the BI subheader 111 for indicating the current loading state of the RACH. In the aforementioned examples, the wireless communication devices of MTC devices can have different priorities from the wireless communication devices of human-to-human communication (H2H).

However, the disclosure is not limited to only two priorities. In other embodiments, the random access method may support wireless communication devices of three or more priorities (or more priority classes). In addition, the aforementioned heavily loaded state can also be a crowded load state (for example, the average utilization rate of the RACH is greater than 80%), and the aforementioned lightly loaded state may also be a non-crowded load state (for example, the average utilization rate of the RACH is less than 30%).

In the proposed random access method, when the reserved bit (R) 113 is 0 (the default value of the BI subheader 111), the RACH is in the lightly loaded state. On the contrary, when the RACH is in the heavily loaded state, the base station sets the reserved bit (R) 113 to 1 for notifying the wireless communication devices of the different priorities that currently the RACH is in the heavily loaded state, so that the wireless communication devices of the different priorities can change their random access behaviors.

Figure 3:
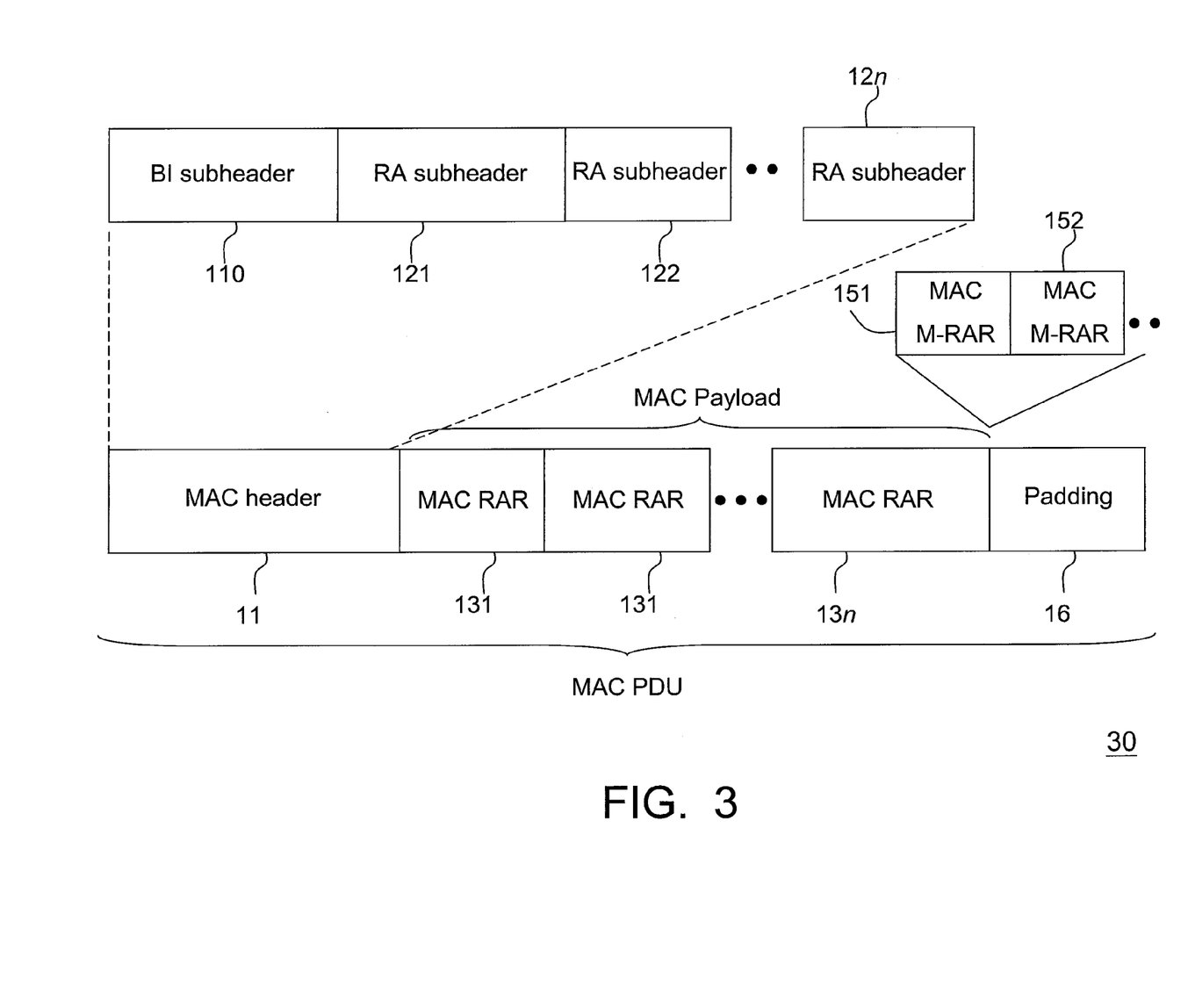
FIG. 3 is a schematic diagram of a MAC PDU according to a first exemplary embodiment of the disclosure.

FIG. 3 is a schematic diagram of a MAC PDU according to a first exemplary embodiment of the disclosure. As shown in FIG. 3, in the random access method provided by the first exemplary embodiment, once the reserved bit (R) 113 is set to 1, one or more MAC M-RARs (for example, the MAC M-RARs 151 and 152 in FIG. 3) are further added (appended) after the last MAC RAR 13n of the MAC PDU 30 and before the padding bit 16. It should be noted that the padding bit 16 is optional in the present disclosure. The MAC M-RARs 151 and 152 are used for assigning specific parameters (for example, a specific BO parameter, a specific access class barring (ACB) parameter, a specific RACH resource parameter, or a specific PRACH resource allocation) or for processing any RA control parameter of RA procedures of different priority classes. For those wireless communication devices of different priorities, when they read the reserved bit is set to 1, the wireless communication devices will try to read the MAC M-RARs and find the associated one according to the priority. After that, the specific parameters in the MAC M-RAR can be used by wireless communication devices of different priority classes to adopt their RA controls.

Since the random access method supports more than two priority classes, when the wireless communication devices in a wireless communication system are grouped into wireless communication device groups of n priority classes, a base station can respectively assign specific BO parameters by using n MAC M-RARs, so that the n groups of wireless communication devices are applied different parameters to achieve different access priorities.

Figure 4:
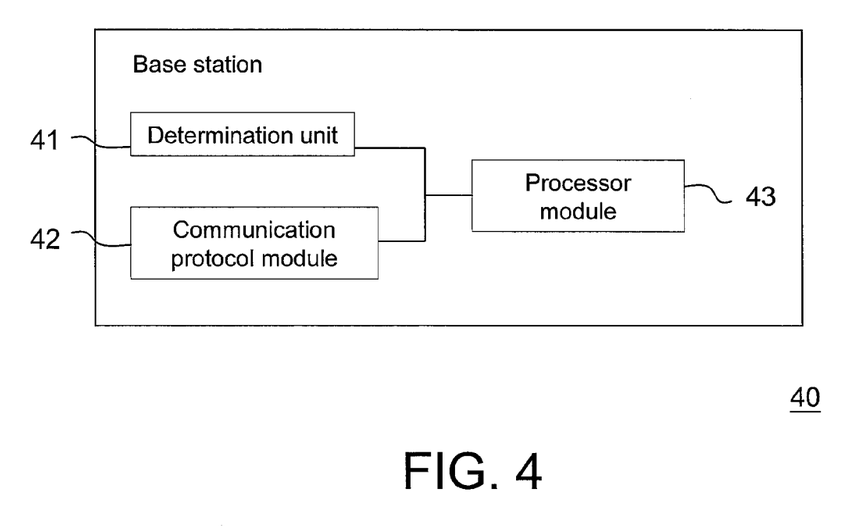
FIG. 4 is a functional block diagram of a base station according to an exemplary embodiment of the disclosure.

FIG. 4 is a functional block diagram of a base station according to an exemplary embodiment of the disclosure. Referring to FIG. 4, the base station 40 includes a determination unit 41, a communication protocol module 42, and a processor module 43. The determination unit 41 determines the current load state of a RACH. The communication protocol module 42 is connected to the determination unit 41. The communication protocol module 42 executes a parameter assignment procedure and RA procedures of wireless communication devices within the area covered by the communication protocol module 42. The communication protocol module 42 also appends one or more MAC M-RARs to a last MAC RAR in a downlink MAC PDU when the communication protocol module 42 receives a command from the determination unit 41, so as to respectively pass specific parameters corresponding to different priority classes. The processor module 43 is connected to the determination unit 41 and the communication protocol module 42. The processor module 43 coordinates the determination unit 41 and the communication protocol module 42. In addition, the base station 40 further includes other components, such as an antenna module (not shown), a transceiver module (not shown), and a memory module (not shown), for transmitting and receiving wireless signals.

Figure 5:
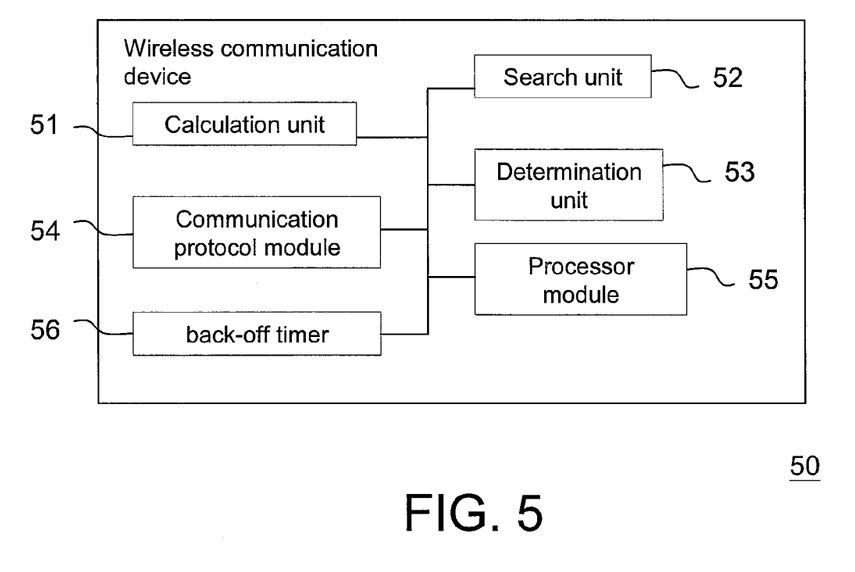
FIG. 5 is a functional block diagram of a wireless communication device according to an exemplary embodiment of the disclosure.

FIG. 5 is a functional block diagram of a wireless communication device according to an exemplary embodiment of the disclosure. Referring to FIG. 5, the wireless communication device 50 includes a calculation unit 51, a search unit 52, a determination unit 53, a communication protocol module 54, a processor module 55, and a back-off timer 56. When a preamble code is transmitted to a base station in a specific wireless resource of a RACH, the calculation unit 51 calculates a RA-RNTI corresponding to the wireless resource.

The search unit 52 is connected to the calculation unit 51. The search unit 52 searches for a MAC PDU corresponding to the RA-RNTI in a downlink physical control channel. The search unit 52 also decodes a BI subheader in the MAC PDU and gets a corresponding BO parameter based on BO parameter mapping table. In addition, the search unit 52 further decodes a MAC RAR according to the RAPID in each RA subheader.

The determination unit 53 is connected to the search unit 52. The determination unit 53 determines the load state of the RACH notified by the base station according to a specific reserved bit in the BI subheader. For example, the specific reserved bit can be the reserved bit 113 of the BI subheader 110 in FIG. 2A. In addition, when the determination unit 53 determines that the RACH is indicated as a heavily loaded state, the search unit 52 further searches for a MAC M-RAR, which is corresponding to the priority class of the wireless communication device, and appended after the last MAC RAR in the MAC PDU.

The communication protocol module 54 is connected to the search unit 52 and the determination unit 53. The communication protocol module 54 performs a RA procedure and obtains at least a specific parameters from the BI subheader and the MAC RAR or the MAC M-RAR. Here, the at least a specific parameters can be a specific BO parameter, a specific ACB parameter, or a specific RACH resource parameter. Alternatively, the communication protocol module 54 also processes other parameters of the RA procedure. The back-off timer 56 is connected to the communication protocol module 54, and configured for counting down a back-off time obtained by the communication protocol module 54 according to a back-off value in a packet, where the communication protocol module 54 waits for the back-off timer 56 expires and sends another preamble code when the second random access response is not found.

The processor module 55 is connected to the calculation unit 51, the search unit 52, the determination unit 53, the communication protocol module 54, and the back-off timer 56. The processor module 55 coordinates the calculation unit 51, the search unit 52, the determination unit 53, the communication protocol module 54, and the back-off timer 56. In addition, the wireless communication device 50 further includes other components, such as an antenna module (not shown), a transceiver module (not shown), and a memory module (not shown), for transmitting and receiving wireless signals.

Figure 6A:
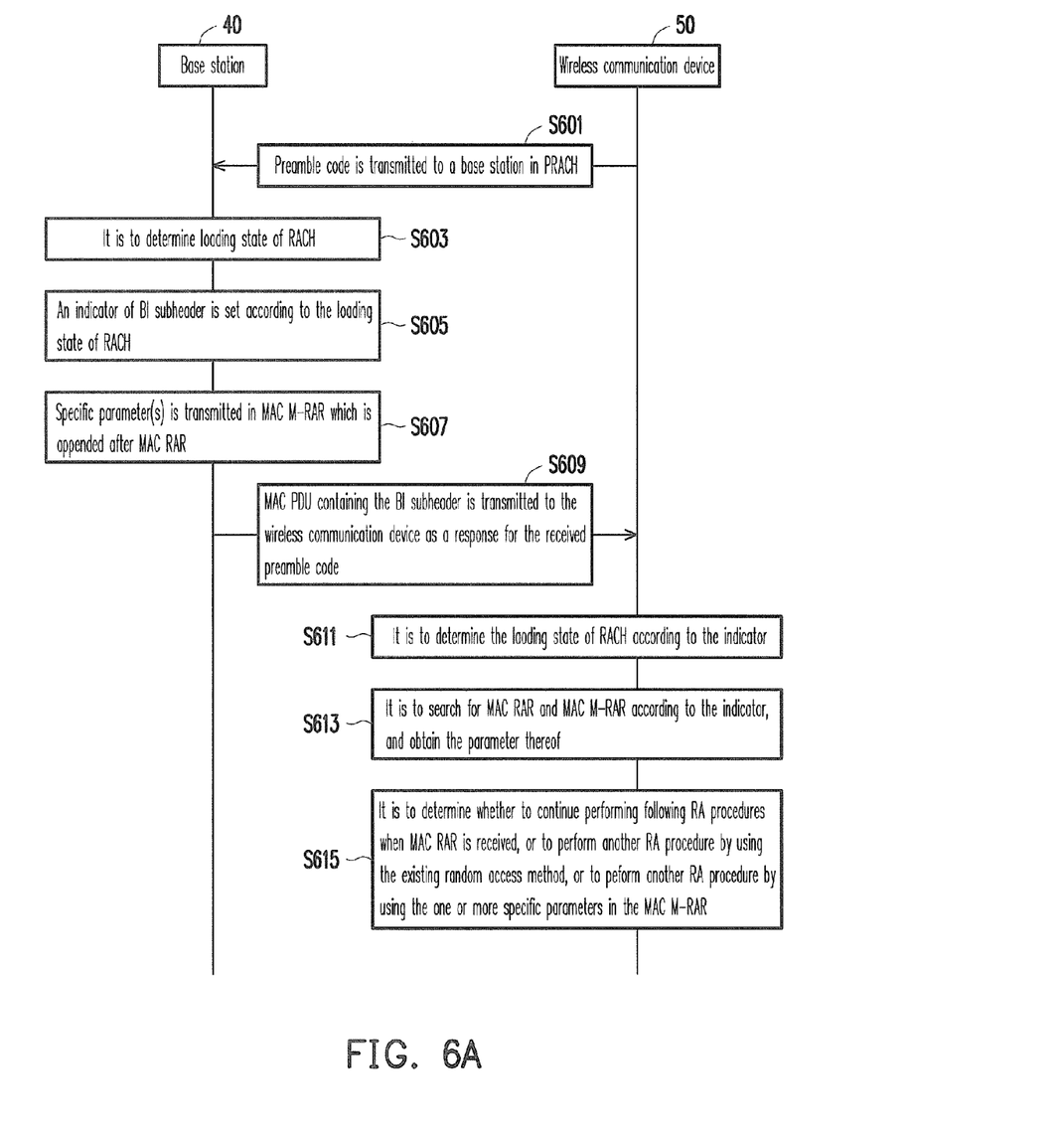
FIG. 6A is a flowchart of a random access method according to a second exemplary embodiment of the disclosure.

FIG. 6A is a flowchart of a random access method according to a second exemplary embodiment of the disclosure. Referring to FIG. 6A, the random access method starts from step S601. In the step S601, the communication protocol module 54 of the wireless communication device 50 transmits a preamble code to the base station 40 in a PRACH.

In step S603, the determination unit 41 of the base station 40 determines the load state of the RACH.

In step S605, the communication protocol module 42 of the base station 40 sets a reserved bit in a BI subheader according to the load state of the RACH. For example, when the RACH is in a heavily loaded state, the communication protocol module 42 sets the reserved bit in the BI subheader to 1, and when the RACH is in a lightly loaded state, the communication protocol module 42 sets the reserved bit in the BI subheader to 0.

Furthermore, in the present embodiment, the communication protocol module 42 of the base station 40 can further set other indicators in a downlink control signal in order to notify all the wireless communication devices within the wireless service coverage area of the base station 40 that: (1) at least an additional MAC M-RAR is appended to the last regular MAC RAR in the MAC PDU; (2) the at least an additional MAC M-RAR in the MAC PDU has one or more specific parameters; (3) whether the RACH is in a crowded load state (or heavily loaded state); or (4) one or more first-type wireless communication devices should perform different random access procedures from the random access procedures performed by one or more second-type wireless communication devices. However, the disclosure is not limited thereto. In addition, the indicators in the downlink control signal can be reserved bits in the BI subheader.

In step S607, the communication protocol module 42 of the base station 40 appends one or more MAC M-RARs to the last MAC RAR in the MAC PDU to transmit one or more specific parameters to wireless communication devices of one or more priority classes.

In step S609, the communication protocol module 42 of the base station 40 transmits the MAC PDU as a response for the received preamble code.

In step S611, the determination unit 53 of the wireless communication device 50 determines the load state of the RACH according to a specific reserved bit in the BI subheader.

In step S613, the search unit 52 searches for a MAC RAR and a MAC M-RAR according to the determination result of the determination unit 53, and obtains the one or more parameters carried by the MAC RAR and MAC M-RAR. For examples, when the determination unit 53 determines that the RACH is in a heavily loaded state according to the specific reserved bit in the BI subheader, the search unit 52 will searches for the belonged MAC RAR based on its RAPID and MAC M-RAR. When the RAPID is not presented in any RA subheader, this means a collision occurred during the previous preamble code transmission. Thus, the search unit 52 performs specified RA procedures with the assigned parameters in the corresponding MAC M-RAR. On the other hand, when the determination unit 53 determines that the RACH is in a lightly loaded state according to the specific reserved bit in the BI subheader, no MAC M-RAR is appended in the MAC PDU. Thus, the search unit 52 needs only search for the corresponding MAC RAR.

In step S615, the communication protocol module 54 determines whether to continue performing the following RA procedure when the MAC RAR is received, or perform another RA procedures by using the existing random access method, or perform another RA procedures by using the one or more specific parameters in the MAC M-RAR.

Figure 6B:
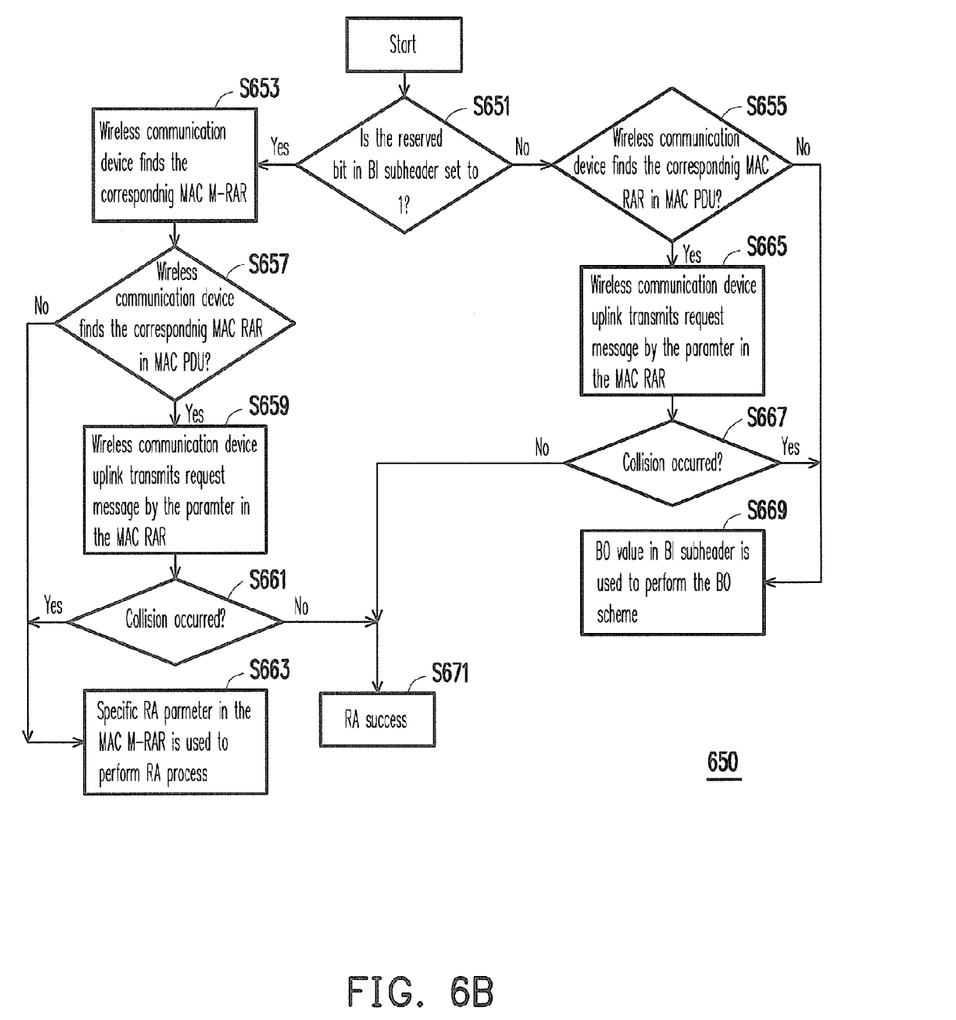
FIG. 6B is a flowchart of a random access sub-procedure according to the second exemplary embodiment of the disclosure.

FIG. 6B is a flowchart of a RA sub-procedure according to the second exemplary embodiment of the disclosure. The detailed technical contents of steps S611-S617 in FIG. 6A are further explained in this RA procedure selecting method. The RA sub-procedure 650 starts from step S651. In the step S651, the determination unit 53 of the wireless communication device 50 determines whether a specific reserved bit in the BI subheader is set to 1. In the step S651, when the specific reserved bit in the BI subheader is set to 1, the determination unit 41 of the base station 40 determines that the RACH is in a heavily loaded state and step S653 is then executed. In the step S651, when the specific reserved bit in the BI subheader is not set to 1, the determination unit 41 determines that the RACH is in a lightly loaded state and step S655 is then executed.

In the step S653, the search unit 52 of the wireless communication device 50 finds a MAC M-RAR corresponding of the priority class of the wireless communication device 50 and obtains parameters in the MAC M-RAR from the communication protocol module 54. In another exemplary embodiment, in the step S653, the base station 40 can further use other specific wireless resources (for example, a BO message) to transmit the specific BO parameter required by the communication protocol module 54 of the wireless communication device 50, so that when a collision is encountered in a RA procedure or the RACH is in a heavily loaded state, the communication protocol module 54 can perform a BO procedure according to the specific BO parameter.

In the step S655, the search unit 52 of the wireless communication device 50 searches for the MAC RAR based on the RAPID in the MAC PDU. When the search unit 52 finds the MAC RAR, step S665 is executed after the step S655. On the other hand, when the search unit 52 does not find the MAC RAR, it means that a collision is encountered in the previous RA procedure. Thus, step S669 is executed after the step S655.

In step S657, a determination process similar to that in step S655 is performed. When the determination result is that the belonged MAC RAR is found, step S659 is executed after step the S657. On the other hand, when the determination result is that the belonged MAC RAR is not found, step S663 is executed after the step S657.

In the step S659, the communication protocol module 54 of the wireless communication device 50 transmits a request message by using the parameters in the MAC RAR.

In step S661, the determination unit 53 of the wireless communication device 50 determines whether any collision is encountered in the transmitting processes in step S659, the step S661, when an collision is encountered in the step S659, step S663 is executed after the step S661; otherwise, when no collision is encountered in the step S659, step S671 is executed after the step S661.

In step the S663, the communication protocol module 54 of the wireless communication device 50 performs a RA procedure by using one or more specific parameters in the MAC M-RAR.

In step S667, when the determination result is that a collision was detected, step S669 is executed after the step S667. On the other hand, when the determination result is that no collision was detected in the step S667, step S671 is executed after the step S667. In step S669, the communication protocol module 54 of the wireless communication device 50 finds a BO parameter according to the BI in the BI subheader, so as to perform a BO scheme in the RA procedure.

In the step S671, the determination unit 53 of the wireless communication device 50 determines whether the RA procedure is successfully completed. After the step S671, the RA sub-procedure 650 is completed.

Figure 7:
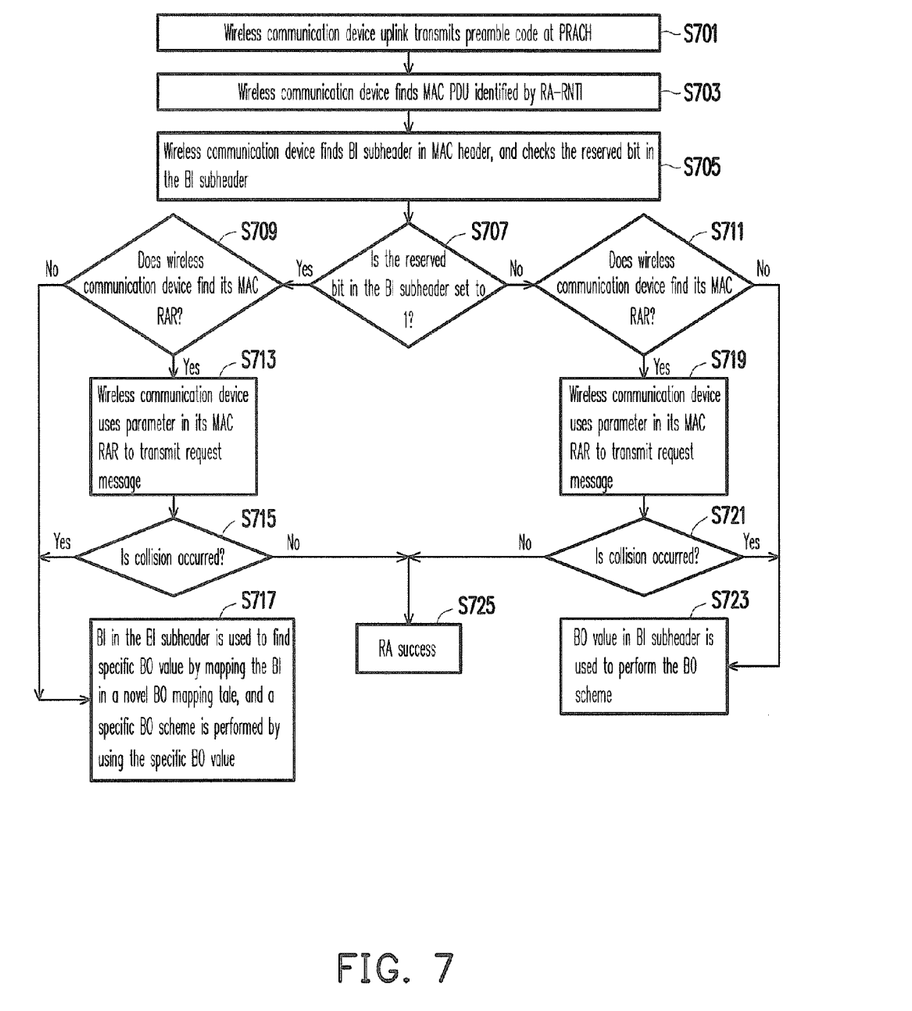
FIG. 7 is a flowchart of a random access method according to a third exemplary embodiment of the disclosure.

FIG. 7 is a flowchart of a random access method according to a third exemplary embodiment of the disclosure. This random access method is similar to the random access method illustrated in FIGS. 6A and 6B. Referring to FIG. 7, the random access method starts from step S701, where the communication protocol module 54 of the wireless communication device 50 transmits a preamble code to a base station in a PRACH. In step S703, the search unit 52 of the wireless communication device 50 receives a MAC PDU corresponding to a RA-RNTI. In step S705, the search unit 52 finds a BI subheader in a MAC header and checks specific reserved bit in the BI subheader.

In step S707, the determination unit 53 of the wireless communication device 50 determines whether a reserved bit in the BI subheader is set to 1. When the reserved bit in the BI subheader is set to 1, the determination unit 41 of the base station 40 determines that the RACH is in a heavily loaded state, and step S709 is executed after the step S707. When the reserved bit in the BI subheader is not set to 1, the determination unit 41 determines that the RACH is in a lightly loaded state, and step S711 is executed after the step S707.

In the step S709 and the step S711, the determination unit 53 determines whether the search unit 52 of the wireless communication device 50 finds its MAC RAR (based on the RAPID in the MAC PDU). When the search unit 52 of the wireless communication device 50 finds its MAC RAR in the step S709, step S713 is executed; otherwise, step S717 is executed. When the search unit 52 of the wireless communication device 50 finds its MAC RAR in the step S711, step S719 is executed; otherwise, step S723 is executed.

In the step S713 and the step S719, the communication protocol module 54 uses its MAC RAR to transmit request message to the base station.

In step S715, the determination unit 53 determines whether any collision is encountered in the transmitting processes in the step S713. When the determination result is that a collision was detected in the step S713, step S717 is executed after the step S715. On the other hand, when the determination result is that no collision was detected in the step S713, step S725 is executed after the step S715. In the step S717, the search unit 52 of the wireless communication device 50 uses BI in the BI subheader to find specific BO value by mapping the BI in a novel BO mapping table, and the communication protocol module 54 uses the specific BO value to perform a specific BO schemes (procedures).

In step S721, the determination unit 53 determines whether any collision is encountered in the transmitting processes in step S719. When the determination result is that a collision was detected in the step S719, step S723 is executed after the step S721. On the other hand, when the determination result is that no collision was detected in the step S719, the step S725 is executed after the step S721. In the step S723, the communication protocol module 54 of the wireless communication device 50 uses the specific BI value in the BI subheader to perform a specific BO scheme.

In the step S725, the determination unit 53 determines whether the RA procedure is successfully completed. After the step S725, the random access method of the third exemplary embodiment is completed.

Performing the BO procedure by using the specific BO parameter in the MAC M-RAR is a first implementation in the third exemplary embodiment.

According to another exemplary embodiment, in the step S717, the communication protocol module 54 of the wireless communication device 50 uses a specific BI parameter mapping table different from that in a regular wireless communication device to obtain a specific BO parameter from the specific BI parameter mapping table according to a BI value in the BI subheader, and the communication protocol module 54 then performs the BO procedure according to the specific BO parameter.

According to yet another exemplary embodiment, in the step S717, the communication protocol module 54 of the wireless communication device 50 further uses a predefined equation and a BO parameter mapping table of a regular wireless communication device to obtain the specific BO parameter according to operation coefficients provided by the wireless communication system and performs the BO procedure according to the specific BO parameter. For example, the wireless communication system broadcasts a control signal and the communication protocol module 54 obtains the operation coefficients multiple coefficients in advance. In the following, when the communication protocol module 54 obtains a BO parameter from the regular BO parameter mapping table according to a BI value in the BI subheader, the communication protocol module 54 can obtain the specific BO parameter by using following formula (1):

$$\text{Specific\_}B\text{oparameter} = \text{BO paramter} \times \text{multiple\_coefficient} \quad \text{Formula (1)}$$

In the foregoing formula (1), the multiple_coefficient can enlarge or reduce the value range of the BO parameter for several times.

Figure 8:
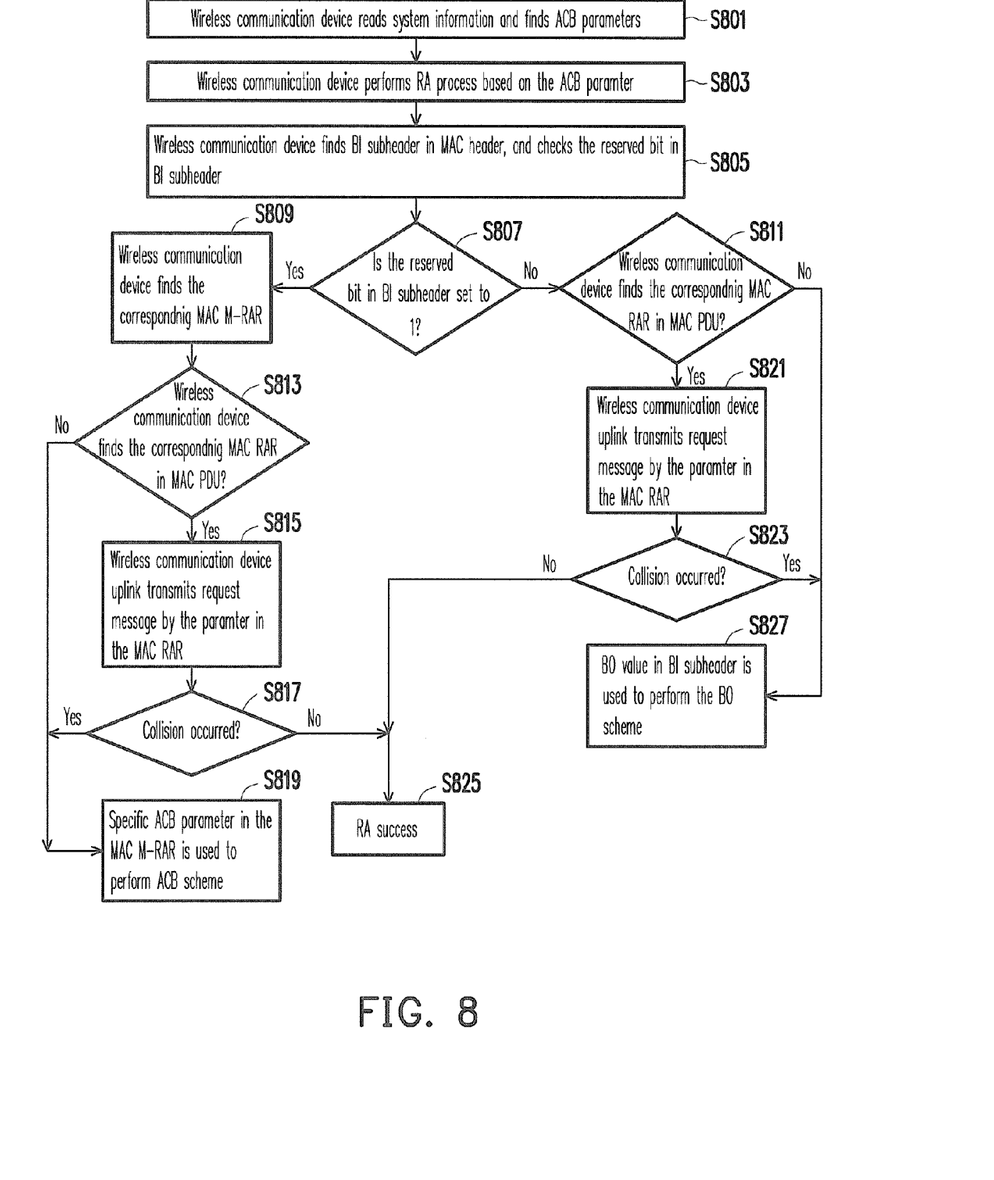
FIG. 8 is a flowchart of a random access method according to a fourth exemplary embodiment of the disclosure.

FIG. 8 is a flowchart of a random access method according to a fourth exemplary embodiment of the disclosure. The random access method is similar to the random access method illustrated in FIG. 7. Referring to FIG. 8, the random access method starts from step S801, where the communication protocol module 54 of the wireless communication device 50 reads a system information and finds an belonged ACB parameter. In step S803, the communication protocol module 54 performs a RA procedure according to the ACB parameter. Following steps S805-S827 are similar to the steps S705-S725 in FIG. 7, and the technical contents of the steps S805-S827 will not be repeated herein. In step S819, the communication protocol module 54 of the wireless communication device 50 performs an ACB procedure by using the specific ACB carried by the MAC M-RAR.

Figure 9:
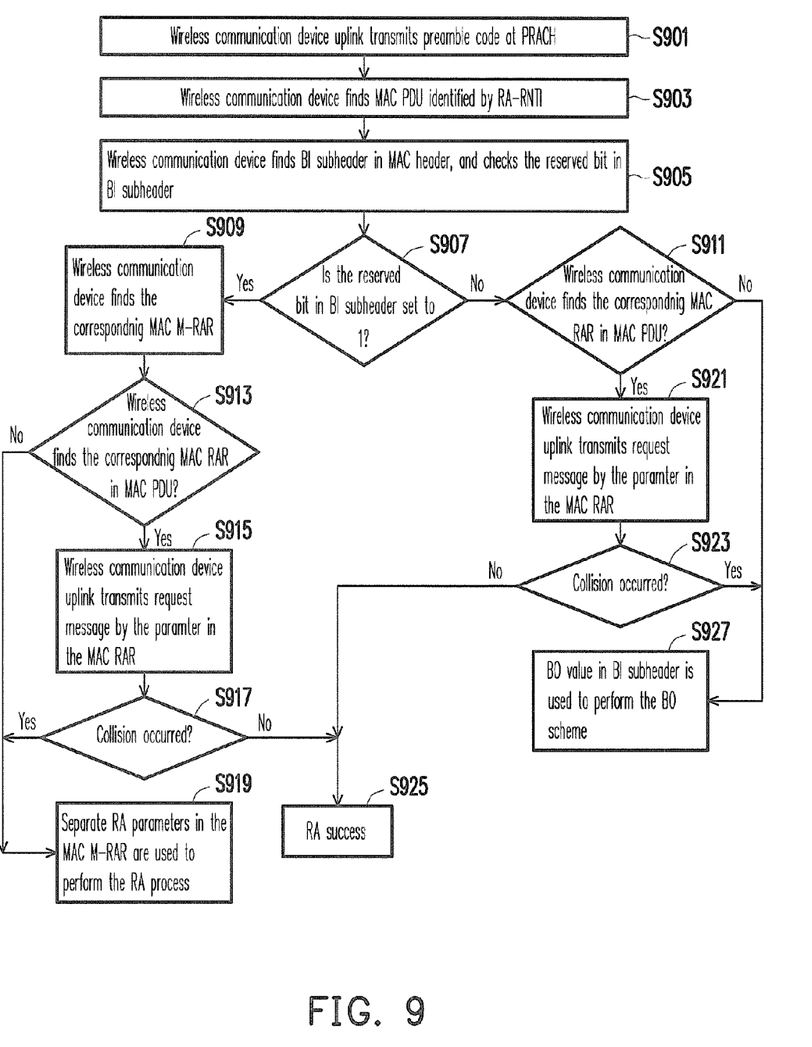
FIG. 9 is a flowchart of a random access method according to a fifth exemplary embodiment of the disclosure.

FIG. 9 is a flowchart of a random access method according to a fifth exemplary embodiment of the disclosure. The random access method illustrated in FIG. 9 is similar to the random access method illustrated in FIG. 7. Referring to FIG. 9, the difference between the random access methods in both FIG. 7 and FIG. 9 lies on step S919, where the communication protocol module 54 of the wireless communication device 50 performs a RA procedure by using a specific RA parameter in the MAC M-RAR which is separated (or different) from other priority class groups.

In summary, exemplary embodiments of the disclosure provide a random access method, a parameter assignment method, a wireless communication device, and a base station using the same methods. The base station executes the parameter assignment method so that when the load state of random access channel changes, wireless communication devices can be effectively notified to change their RA behaviors according to the current load state, and different types of parameters can be respectively assigned to wireless communication devices of different priorities. Thereby, different priorities of wireless communication devices can have different access priority on the random access process.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A random access method, adapted for a wireless communication device to perform a random access process with a base station, the random access method comprising:
   transmitting, at the wireless communication device, a preamble code to the base station;
   obtaining, at the wireless communication device, an indicator in a packet transmitted by the base station;
   determining, at the wireless communication device, whether to obtain a first random access response in the packet according to the indicator; and
   searching, at the wireless communication device, for a second random access response in the packet according to the preamble code,
   wherein when the wireless communication device determines to obtain the first random access response according to the indicator, the random access method further comprises:
   sending a request message to the base station according to a command in the second random access response when the second random access response is found; and
   performing another random access process with the base station according to a command in the first random access response when the second random access response is not found.

2. The random access method according to claim 1, wherein when the wireless communication device determines not to obtain the first random access response according to the indicator, the random access method further comprises:
   sending a request message to the base station according to a command in the second random access response when the second random access response is found; and
   waiting for a back-off timer expires and sending another preamble code when the second random access response is not found, wherein the back-off timer is obtained according to a back-off value in the packet.

3. The random access method according to claim 1, further comprising:
   obtaining, at the wireless communication device, the first random access response according to a priority class of the wireless communication device, wherein the command in the first random access response is different for wireless communication devices according to their respective priority classes.

4. The random access method according to claim 1, wherein the command in the first random access process further comprises at least one back-off timer, or at least one access class baring parameter, or at least one random access resource.

5. The random access method according to claim 3, wherein the wireless communication device of a respective priority class performs a respective random access process by using the associated command in the first random access response.

6. A parameter assignment method, adapted to a base station, the parameter assignment method comprising:
   receiving, at the base station, at least one preamble code in a random access resource;
   determining, at the base station, an indicator in a packet, wherein:
      when the indicator is set up, at least a first random access response and at least a second random access response are appended in the packet; and
      when the indicator is not set up, just at least a second random access response are appended in the packet; and
   transmitting, at the base station, the packet,
   assigning, at the base station, at least a command in the first random access response respectively corresponding to priority classes of wireless communication devices, wherein the command comprises at least one back-off timer, or at least one access class baring parameter, or at least one random access resource.

7. The parameter assignment method according to claim 6, wherein the step of determining the indicator in the packet comprises:
   determining, at the base station, whether the indicator is set or not according to a loading of random access resources or a loading of network.

8. The parameter assignment method according to claim 6, wherein the base station notifies a wireless communication device whether to obtain at least a command in the at least a first random access response by using the indicator.

9. The parameter assignment method according to claim 8, wherein the base station notifies the wireless communication devices of different priority classes to perform their respective random access processes by the associated command in the first random access response.

10. A wireless communication device, adapted to perform a random access process with a base station, the wireless communication device comprising:
   a communication protocol module, configured for transmitting a preamble code to the base station;
   a search unit, connected to the communication protocol module, configured for obtaining an indicator in a packet transmitted from the base station;
   a determination unit, connected to the communication protocol module and the search unit, configured for determining whether to obtain a first random access response in the packet according to the indicator; and
   the search unit is also configured for searching for a second random access response in the packet according to the preamble code,
   wherein when the determination unit determines to obtain the first random access response according to the indicator, the communication protocol module sends a request message to the base station according to a command in the second random access response when the second random access response is found, and the communication protocol module performs another random access process with the base station according to a command in the first random access response when the second random access response is not found.

11. The wireless communication device according to claim 10, wherein when the determination unit determines not to obtain the first random access response according to the indicator, the communication protocol module further sends a request message to the base station according to a command in the second random access response when the second random access response is found.

12. The wireless communication device according to claim 10, wherein when the determination unit determines not to obtain the first random access response according to the indicator, the wireless communication device further comprises:
   a back-off timer, connected to the communication protocol module, and configured for counting down a back-off time obtained by the communication protocol module according to a back-off value in the packet, wherein the communication protocol module waits for the back-off timer expires and sends another preamble code when the second random access response is not found.

13. The wireless communication device according to claim 10, wherein the command in the first random access process further comprises at least one back-off timer, or at least one access class baring parameter, or at least one random access resource.

14. The wireless communication device according to claim 10, wherein the communication protocol module of the wireless communication device of a respective priority class performs a respective random access process by using the associated command in the first random access response.

15. A base station, comprising:
   a communication protocol module, configured for receiving at least one preamble code in a random access resource;
   a determination unit, connected to the communication protocol module, configured for determining an indicator in a packet, wherein when the indicator is set up, the determination unit appends at least a first random access response and at least a second random access response in the packet, and when the indicator is not set up, the determination unit appends just at least a second random access response in the packet; and
   the communication protocol module transmits the packet, wherein the communication protocol module assigns at least a command in the first random access response respectively corresponding to priority classes of wireless communication devices, wherein the command comprises at least one back-off timer, or at least one access class baring parameter, or at least one random access resource.

16. The base station according to claim 15, wherein the determination unit determines whether the indicator is set or not according to a loading of random access resources or a loading of network.

17. The base station according to claim 15, wherein the communication protocol module notifies a wireless communication device whether to obtain at least a command in the at least a first random access response by using the indicator.

18. The base station according to claim 15, wherein the communication protocol module notifies the wireless communication devices of different priority classes to perform their respective random access processes by the associated command in the first random access response.

* * * * *